Figure 1:
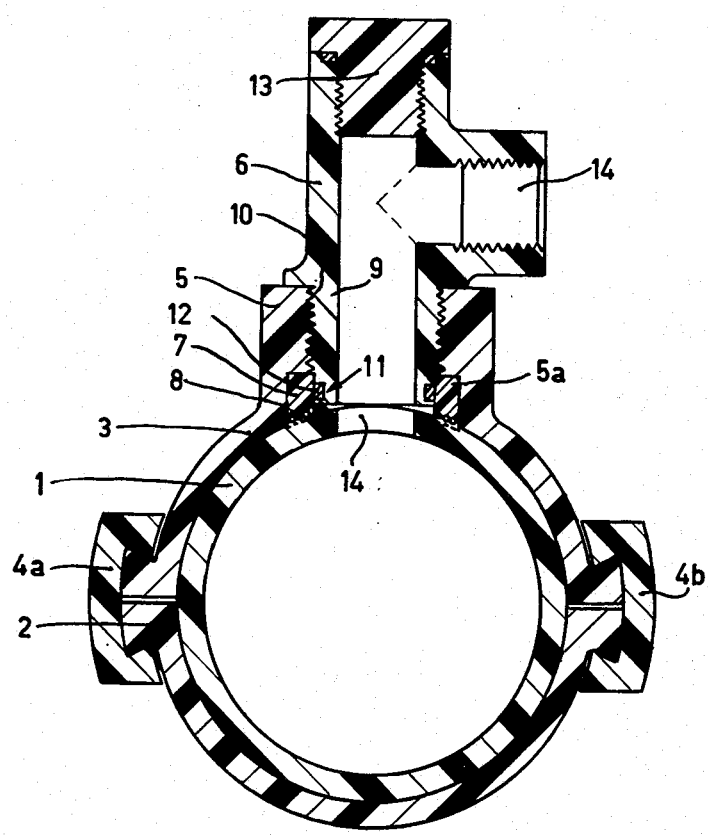

United States Patent [19]
Acda

[11] 3,918,748
[45] Nov. 11, 1975

[54] BRANCH CONNECTION FOR THERMOPLASTIC PIPE

[75] Inventor: Petrus Marinus Acda, Enkhuizen, Netherlands

[73] Assignee: Polva Nederland B.V., Netherlands

[22] Filed: Sept. 12, 1974

[21] Appl. No.: 505,241

[30] Foreign Application Priority Data
Sept. 14, 1973 Netherlands .................... 7312742

[52] U.S. Cl. ................. 285/21; 285/114; 285/197
[51] Int. Cl.² ................... F16L 41/04; F16L 47/02
[58] Field of Search ............ 285/197, 198, 199, 21, 285/114, 286

[56] References Cited
UNITED STATES PATENTS
2,736,335   2/1956   Webber ......................... 285/197 X

| | | |
|---|---|---|
| 2,839,075 | 6/1958 | Mueller ........................ 285/197 X |
| 3,132,881 | 5/1964 | Corey ............................. 285/197 |
| 3,422,179 | 1/1969 | Bauer et al. ...................... 285/21 |
| 3,779,272 | 12/1973 | Dunmire ....................... 285/197 X |

FOREIGN PATENTS OR APPLICATIONS

| | | | |
|---|---|---|---|
| 1,049,172 | 1/1959 | Germany | ............................ 285/197 |
| 1,145,559 | 3/1969 | United Kingdom | .................. 285/197 |
| 1,447,919 | 6/1966 | France | ............................... 285/197 |

*Primary Examiner*—Thomas F. Callaghan
*Attorney, Agent, or Firm*—Frank R. Trifari; David R. Treacy

[57] ABSTRACT

A branch connection for clamping to pipes of thermoplastic synthetic resin. The connection has an insert of synthetic resin which is connected to the main pipe by means of welding.

3 Claims, 2 Drawing Figures

U.S. Patent  Nov. 11, 1975  3,918,748

BRANCH CONNECTION FOR THERMOPLASTIC PIPE

The invention relates to a branch connection for thermoplastic synthetic resin pipes, having one or more shell-shaped parts which can be clamped onto a main pipe and encompass the main pipe completely or substantially completely, a shell-shaped part having means for connecting a branch pipe to the main pipe.

Branch connections of this kind are known. A gas or watertight closure is often obtained by sealing rings, for example, in the form of natural or synthetic rubber rings having a circular cross-section. A satisfactory seal is obtained upon correct adjustment of the pressure exerted by the sealing number on the wall of the pipe. In the long run, however, the pressure exerted by the sealing member on the wall of the pipe leads to deformation of the pipe. This deformation may be such that the gas or water-tightness of the connection is jeopardized. This phenomenon is particularly apt to occur with polyolefin pipes.

A branch connection is known in which a shell- or saddle-shaped part is connected to the pipe by means of welding. A satisfactory welded joint can be obtained only if the properties of the materials constituting the shell-shaped part and the pipe are compatible to each other. In many cases an optimum welded joint will only be possible if the same material is used for both pieces.

External forces may occur when parts of pipes coupled by means of branch connections are displaced in an unequal manner in the earth, for example, due to sagging.

In addition to a satisfactory seal, sufficient clamping of the pipe must be obtained by means of the shell-shaped parts. Only in that case can such external forces, exerted on the branch connection, be absorbed by the branch connection and the pipe without inadmissible stress in the welded joint. The choice of material for the shell-shaped parts which is optimum for obtaining a satisfactory welded joint with the pipe is, however, often not optimum with respect to this clamping function.

An object of the invention is to provide a branch connection in which the drawbacks of the known constructions do not occur.

According to the invention this object is achieved by a branch connection in which the means for connecting the branch pipe to the main pipe includes a branching member which is connected to one or the shell-shaped part and communicates with the main pipe through a cylindrical insert welded to the main tube and encompassed by a shell-shaped part.

In a preferred embodiment sealing members are provided between the branching member and the insert. It is, however, alternatively possible to connect the branching member to the insert by means of welding, for example resistance welding, for which purpose a resistance heating wire may be accommodated in either the branching member or the insert or in both pieces.

In the branch connection according to the invention the branching member may consist of, a T-shaped tapping member in which, for example, one of a legs is provided with an external screwthread engaging the screwthread provided on the inner side of an aperture in a shell-shaped part. To this end the shell-shaped part is locally provided with a fitting and projecting portion which generally is tubular and is suitable for accommodating the leg of the branching member and for encompassing the insert.

The cylindrical insert may be connected to the main tube by means of any suitable welding method, such as by butt welding. In a preferred embodiment a resistance welding method is used. For this purpose a resistance wire is accommodated in the end of the insert facing the pipe so that upon connection of the wire to a current source sufficient heat can be developed to obtain a welded joint. The insert preferably is made of the same synthetic resin as the main tube, for example, polyethylene.

The sealing member to be used may consist of, for example, an O-ring of natural or synthetic rubber. Preferably the sealing member is provided between the inner wall of the insert and the outer wall of the portion of the branching member located therein. For this purpose one of the walls may be recessed. In this manner the insert is encompassed such that deformation of the insert under the influence of pressure exerted thereon by the sealing member is impossible.

The shell-shaped parts may consist of such materials and have such wall thicknesses as is considered optimum in connection with their clamping function. Under these circumstances some suitable materials are cast iron, polypropylene, or polyvinylchloride, polyoxymethylene.

The shell-shaped parts may be secured in a clamping manner to the pipe by means of clamps or, for example, by bolts and nuts. When a single shell-shaped part is provided it may be formed as a cylinder of ductile material split parallel to its axis, which can completely or substantially completely encompass the pipe and can be bent open far enough so as to be provided sideways onto the pipe.

The branch connection according to the invention can be mounted in a simple manner.

To this end the shell-shaped part(s) is (are) clamped onto the pipe, the cylindrical insert previously placed in a shell-shaped part is welded to the tube, and the branching member is secured in this shell-shaped part. Thereafter a hole may be cut by means of a suitable tool in the part of the wall of the main pipe to which the insert opens.

An embodiment of a branch connection according to the invention will now described in greater detail with reference to the accompanying drawing.

Figure 2:
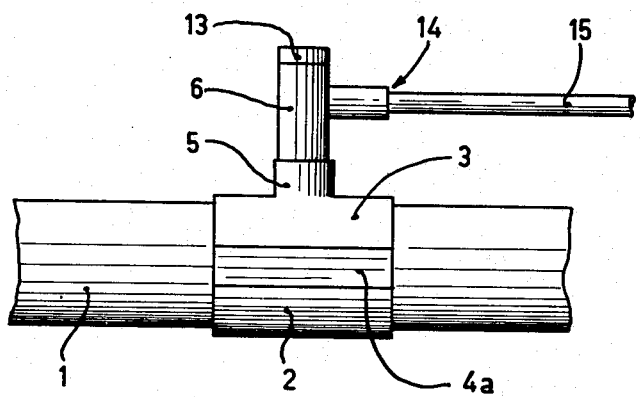

FIG. 1 shows a view in cross-section of a branch connection provided on a main pipe, FIG. 2 is a side elevational view of a branch connection to a main pipe.

Shell- or saddle-shaped parts 2 and 3 of polyvinylchloride are provided about a tube 1 of polyethylene. These parts are clamped by means of clamps 4a and 4b of polyvinylchloride onto the main tube 1 and encompass this tube substantially completely. The shell-shaped part 3 is provided with a tubular part 5 which serves to accommodate one of the legs of the branching member 6 of polyvinylchloride and to encompass the insert 7. The insert 7 consists of polyethylene and is connected to the main pipe by means of electrical resistance welding. To this end the insert is provided with resistance wire 8. In order to obtain a mutual pressure of the parts sufficient for welding the height of the insert 7 may be chosen to be slightly larger than the height of the chamber 5a in the tubular part 5. The leg 9 of the branching member 6 projecting into the tubular part 5 is provided with a screwthread 10 likewise as the tubular part 5. The leg 9 has an end piece 11 in which a recess is present for accommodating the rubber O-ring 12. Such a recess may alternatively be provided in the insert 7. Furthermore the branching member 6 has a sealing plug 13 closing the aperture through which a milling cutter or a drill can be introduced so as to provide the hole 14 in the main pipe. Furthermore the branch section 6 has at least one aperture 14 for accommodating a branch pipe 15 (FIG. 2).

In FIG. 2 the reference numerals have the same significance as those in FIG. 1. FIG. 2 shows part of a main pipe 1 and a branch pipe 15 connected by means of a branch connection according to the invention.

The branch connection according to the invention may be mounted in a simple manner. Stresses produced by sagging of tube sections are absorbed by the shell-shaped parts and conducted away as far as possible from the welded joint between the insert part and the main pipe. The branch connection according to the invention is particularly suitable for polyolefin tubes. By using an insert of another suitable material a branch connection according to the invention is easily used with pipes of arbitrary materials.

What is claimed is:

1. A branch connection for connecting a branch pipe to a main pipe made of a thermoplastic material, comprising a cylindrical tubular insert made of a thermoplastic material and having an end adapted for welding to the main pipe; a shell-shaped member arranged to fit about the insert and a portion of the main pipe; means for clamping the member to the main pipe; a branching member; means for connecting a branch pipe to the branching member; means for connecting the branching member to the shell-shaped member; and a sealing ring having an uncompressed annular thickness; wherein said insert has an inner cylindrical surface, and said branching member comprises a portion extending within said insert and having a radial clearance between the extending portion and the inner surface of the insert less than the uncompressed annular thickness of the sealing ring, the sealing ring being compressed between said extending portion and said inner surface.

2. A connection as claimed in claim 1 wherein said shell-shaped member is arranged to fit snugly about the outer cylindrical surface of the insert, whereby deformation of the insert by the sealing ring pressure is prevented.

3. A connection as claimed in claim 2 wherein said insert member consists of the same thermoplastic material as the main pipe.

\* \* \* \* \*